(12) United States Patent
Nemeth et al.

(10) Patent No.: US 7,238,305 B2
(45) Date of Patent: Jul. 3, 2007

(54) THERMALLY RESISTANT ADHESIVE

(75) Inventors: Sandor Nemeth, Singapore (SG); Marcel Rene Boehmer, Eindhoven (NL); Gerard Cnossen, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/552,813

(22) PCT Filed: Apr. 5, 2004

(86) PCT No.: PCT/IB2004/050399

§ 371 (c)(1),
(2), (4) Date: Oct. 11, 2005

(87) PCT Pub. No.: WO2004/092294

PCT Pub. Date: Oct. 28, 2004

(65) Prior Publication Data

US 2006/0210811 A1 Sep. 21, 2006

(30) Foreign Application Priority Data

Apr. 15, 2003 (SG) .................................. 03/00104

(51) Int. Cl.
*H01B 1/00* (2006.01)
*H01B 1/12* (2006.01)
(52) U.S. Cl. ........................ 252/500; 524/435; 501/88; 427/367.1
(58) Field of Classification Search ................ 524/435; 252/512, 514, 500; 174/110; 501/88; 427/367.1
See application file for complete search history.

(56) References Cited

U.S. PATENT DOCUMENTS

| 5,710,203 A | * | 1/1998 | Camilletti et al. .......... 524/435 |
| 5,847,322 A | * | 12/1998 | Sakai et al. ............. 174/110 R |
| 6,066,269 A | * | 5/2000 | Wei et al. .................... 252/500 |
| 2002/0145134 A1 | * | 10/2002 | Olding et al. ............... 252/500 |

FOREIGN PATENT DOCUMENTS

GB    1 544056    4/1979

* cited by examiner

*Primary Examiner*—Mark Kopec
*Assistant Examiner*—Khanh T. Nguyen
(74) *Attorney, Agent, or Firm*—Adam L. Stroud

(57) ABSTRACT

A sol-gel material with metal particles which can be used as a conductive adhesive for systems that have a high operating temperature is disclosed. The material is especially suitable for appliances equipped with a flat heating element, such as steam irons.

8 Claims, No Drawings

THERMALLY RESISTANT ADHESIVE

The present invention relates to an adhesive that is suitable for making an electrically conductive connection to a material or system which is operated at a relatively high temperature. More specifically, the present invention relates to a conductive adhesive that can be used in a heating element. Moreover, the present invention relates to an (electrical) domestic appliance comprising the above adhesive.

A heating element comprising a flat heater system generally comprises two functional layers applied on a substrate, namely an electrically insulating layer and an electrically conductive layer. The function of the insulating layer is to isolate the heat-generating layer from the substrate, which may be directly accessible from the outside. The electrically conductive layer in the above-mentioned heating element generally comprises a layer with a high ohmic resistance, the resistive layer, as well as a layer with a lower ohmic resistance, which acts as a contacting layer. Heat is generated in that an electric current is passed through the resistive layer. The layers with high and low ohmic resistance may be made of different materials, but also of the same material if the thickness or geometry is adjusted.

Insulating and conducting layers are applied on a substrate in the manufacture of flat heating elements. For a functional assembly, current-carrying wires have to be connected to the contacting layer and, optionally, temperature sensors may be attached. Mechanical attachment, for instance by pressure contacts, has drawbacks such as a potential damage to the layer and a limited contact area With conductive adhesives these drawbacks can be avoided, but the demands on the temperature stability of the adhesive are high.

Soldering poses difficulties as standard solder alloys have too low melting temperatures in relation to the relatively high working temperatures of the heating elements which, at the location of the conductor track, may easily reach 300° C. or more. High melting temperature, hard solder alloys are available for temperatures exceeding 450° C., which is too high for use on aluminum substrates. An alternative approach to the problem is to use a glass frit mixed with conductive particles. In general, the processing of this frit requires too high temperatures, which may damage the insulating or conducting layer or even the substrate if aluminum, a favorable substrate for heating elements, is used. Frit glasses with lower melting points often contain lead or other potentially toxic metals, which are to be avoided. In addition, the thermal expansion coefficients of these materials do not match the expansion coefficient of aluminum.

Epoxy resins comprising silver particles are widely used for low-temperature applications, but they do not have a good high temperature stability. Polydimethylsiloxane-based adhesives have a better temperature resistance, but again their temperature stability at working temperatures of 300° C. or more is insufficient. Polyimides have also failed for flat heating applications operating at high temperatures and power densities.

The present invention aims to provide an adhesive that is suitable for making an electrical connection to a material or system which is operated at a relatively high temperature, which connection does not show the above-mentioned disadvantages. To this end the present invention provides an adhesive according to the preamble wherein said adhesive is based on a sol-gel precursor.

High temperature stable connections can be made with the use of sol-gel precursors. Such adhesives based on a solgel precursor can be easily cured by means of heat.

The adhesive is based on a sol-gel precursor and metal particles in particular for making conductive connections.

Several sol-gel precursors may be used. For example, the sol-gel precursor may comprise a compound from the group of tetraalkoxysilanes, alkyl-alkoxysilanes, phenyl-alkoxysilanes, diphenylalkoxysilanes, the hydrolyzed derivatives of said compounds, or combinations thereof.

In a particularly advantageous embodiment of the invention, however, the sol-gel precursor comprises a hybrid sol-gel material based on methyltri(m)ethoxysilane, phenyltri(m)ethoxysilane, and/or diphenyldi(m)ethoxysilane. These materials are known to have an excellent temperature resistance and a high chemical stability. These precursors may be caused to react with water in the presence of a catalyst so as to form reactive silanol groups that will react with each other to provide oligomeric and polymeric binder materials. In some cases precursors containing silanol groups rather than alkoxy groups, such as diphenylsilanediol, may be used directly.

These precursor materials, in particular methyltri(m) ethoxysilane, may also be used in flat heating elements for the conductive layer. In a preferred embodiment, methyltriethoxysilane (MTES) based binder filled with silver particles is used. This combination of materials is used for the conductive track and has shown no signs of degradation after 600 hours of active heating with a power density of 20 $W/cm^2$ at a track temperature of 320° C.

Preferably, the conductive particles comprise silver particles or silver alloy particles. Sol-gel materials, especially methyltrimethoxysilane (MTMS) and methyltriethoxysilane, were shown to stop effectively the migration of silver. An adhesive based on sol-gel/silver materials will accordingly survive the operational demands in a flat heating element.

The use of sol-gel materials is usually restricted to fairly thin layers. For non-hybrid precursors, containing four alkoxy groups, a layer thickness higher than 1 µm cannot be obtained. However, for hybrid materials containing three alkoxy groups and one non-hydrolyzable group, thicker layers can be achieved. For example, a thickness of 2–3 µm is easily reached with MTES. If a hybrid sol-gel system is filled with particles, much thicker layers can be achieved, for instance about 50 µm may be used for the insulating layer of a flat heating element and about 10 µm may be deposited for the conductive layer. In order to obtain such thick layers, the volume fraction of particles must be carefully controlled. Ideally, the particles are densely packed and all the space in between the particles is filled with binder, in this case a binder derived from a sol-gel material. In practice, a volume fraction of particles between 40% and 55% is preferably used for commercially available polydisperse powders. A high conductivity can be achieved at these volume fractions because of the many contacts between the conducting particles.

Although fairly thick for a sol-gel system a thickness of about 50 µm, is not always sufficient for an adhesive. For that purpose, the critical layer thickness is preferably higher, up to about 400 µm, sometimes even 1000 µm, as the leads have to be comparatively thick for the high currents applied. The shrinkage upon drying and curing of particle-filled layers with the concomitant capillary pressure is one of the main factors in limiting the layer thickness that can be obtained. The shrinkage can be minimized by removal of liquids before the application as an adhesive. The liquids present may include alcohols, which are either added or formed in the hydrolysis or alcohol condensation reaction of the sol-gel precursors, water needed for hydrolysis, and other solvents. An advantageous way of removal of liquids is distillation. After hydrolysis of the sol-gel precursor, distillation at a reduced pressure can take place, leaving a concentrated solution in which conductive particles, preferably silver or silver alloy particles, can be dispersed. However, the concentrated solution of the sol-gel materials in the frequently used alcohol-based medium is often unstable, thus reducing the pot life of the binder. In order to improve the stability of the concentrated solution, it is important to select suitable solvents. It was found that ketones (for example methylethylketone, methylisobutylketone, diisobutylketone) are especially good solvents for the binder material and can prolong the pot life considerably. Alternative solvents are aromatics such as benzene, toluene, xylenes and others. However, the use of aromatic solvents is not preferred because of their potentially more serious health hazards.

Apart from the benefits in terms of the greater layer thickness that can be obtained with the use of a concentrated binder solution, minimization of evaporation will also reduce the porosity in the layer, resulting in stronger bonds.

Using this type of resins derived from the hybrid sol-gel precursors and capable of softening or melting during curing can make a further improvement. Commercial resins that have this property are available, and the addition of diphenylsilanediol to the sol-gel formulation also helps in softening or melting during the drying and curing phase. When the sol-gel binder melts during the curing process, it aids the evaporation of solvents by increasing their mobility without the formation of voids and it also strongly reduces the build-up of any drying stress. If the coefficient of thermal expansion of the conductive adhesive is matched to that of the substrate, essentially stress-free adhesive deposits can be prepared. The lack of residual stress and the match of the thermal expansion coefficients then ensures that the adhesive does not crack even in thick layers during temperature cycling. If different substrates are used, the coefficient of thermal expansion of the adhesive can be adjusted in a narrow range by varying the concentration of the conductive metal particles. Obviously, this method has serious limitations, as the electrical conductivity would also be influenced by the variation in the metal particle concentration. An alternative and more general method of adjusting the coefficient of thermal expansion is to incorporate a second type of filler that has a much lower coefficient of thermal expansion than that of the conductive particles. Such fillers are ceramic particles such as alumina, silica, boron nitride, silicon carbide and others that have a lower coefficient of thermal expansion than that of the substrate material. When applying a second type of filler, it is advantageous to limit the particle size of the second filler to below $\frac{1}{10}$, or more preferably to below $\frac{1}{20}$, of the particle size of the conductive particles. This size difference will then ensure that the connections between the conductive particles are not blocked by large particles of non-conductive ceramic material.

Said formulations are very suitable as adhesives for making the electrical contacts of heating elements, especially heating elements made from sol-gel materials. The use of a low shrinking sol-gel system in combination with silver particles renders it possible to achieve a thickness of more than 400 μm while no materials foreign to the sol-gel flat heating systems are introduced, and the silver migration is blocked very effectively by the sol-gel binder. As the materials used in the adhesive and in the conducting layer can be chosen such that they comprise the same particles and sol-gel precursors, no risk of contamination is present, which otherwise could easily change the resistance of the conductive layer. Advantageously, the adhesive can be deposited without pretreatment of the underlying layer. However, pretreatment with, for example, an aminosilane or some other, preferably silane-based, adhesion promoter is optional. The conductive adhesive can be applied before said conductive layer is cured, and may subsequently be co-cured after care has been taken that most of the solvent has evaporated. The hybrid sol-gel precursors used have been shown to effectively reduce the sensitivity to corrosion, so corrosion at the contact point is not likely to occur. Finally, as the thermal expansion coefficient of the particle-filled hybrid sol-gel system can be made to closely match that of aluminum, the adhesive is particularly suitable for heating elements made on an aluminum substrate, which is a preferred substrate for heating elements. The moisture sensitivity of these materials is low, but an additional moisture barrier layer may easily be applied, for example by spray-coating. Especially advantageous compositions comprise sol-gel materials in combination with fluoropolymer particles.

The heat-curable adhesive is particularly suitable for use in the manufacture of electrical contacts of heating elements for electrical domestic appliances comprising a (steam) iron, ironing device, hair dryers, hair stylers, steamers and steam cleaners, garment cleaners, heated ironing boards, facial steamers, kettles, pressurized boilers for system irons and cleaners, coffee makers, deep fat fryers, rice cookers, sterilizers, hot plates, hot-pots, grills, space heaters, waffle irons, toaster, ovens, or water flow heaters.

The invention will be further elucidated in the following examples.

EXAMPLE 1

49.9 grams of methyltrimethoxysilane, 38.4 grams of methylethylketone, 11.6 grams of water and 0.1 gram of maleic acid were mixed together. The mixture was stirred for 2 days, then filtered and placed in a distillation flask. The solvent was partially distilled out at a reduced pressure (700 mbar) and a bath temperature of 80° C. Distillation was continued until the evaporation rate was greatly reduced, such that 37 grams MTMS resin solution was left in the distillation flask from the 100 g initially present.

From this resin solution, a conductive adhesive was prepared using 13.3 grams of the solution, 15.7 grams of methylisobutylketone, and 74.2 grams of silver flakes followed by the evaporation of another 3.2 g methylethylketone that was part of the MTMS resin solution. Droplets of the adhesive were deposited onto either dried, but not yet cured, or fully cured insulating sol-gel layers on an aluminum substrate. They were found to adhere well after drying at 60–80° C., heating to the curing temperature at a rate of less than 10° C./min (more preferably less than 5° C./min), and curing for 15 minutes at 415° C. After curing, adhesive droplets with a height of over 1000 μm showed good adhesion and no cracks. The nominal silver content of the cured adhesive was 52 vol %. Its coefficient of thermal expansion, measured parallel to the substrate surface, was approximately 27 ppm/° C., in the range of 125° C. to 300° C. measured by thermo-mechanical analysis, which is close to that of aluminum.

EXAMPLE 2

A commercially available resin, Silres 610 from Wacker, was used as a binder. This resin contains methylsiloxane polymers and softens at approximately 80° C. to form a melt. It remains in the liquid form during curing up to about 380° C., depending on the heating rate. For the adhesive preparation, 7.8 g Silres 610 resin was mixed with 25.4 g methylethylketone (MEK), 7.0 g diisobutylketone, and 59.9 g silver flakes. The mixture was milled for over one day using 3-mm glass beads. After the milling, 12.1 g MEK was distilled out to obtain a thixotropic liquid. The liquid adhesive was deposited and cured according to the method described in Example 1. After curing, adhesive droplets with a height of over 1000 µm showed good adhesion and no cracks. The nominal silver content of the cured adhesive was 52 vol %. Its coefficient of thermal expansion, measured parallel to the substrate surface, was approximately 25 ppm/° C. in the range of 125° C. to 300° C., nearly identical to that of aluminum.

EXAMPLE 3

Alumina particles were incorporated into Silres 610 from Wacker. For the adhesive preparation, 6.0 g Silres 610 resin was mixed with 25.2 g methylethylketone (MEK), 6.7 g diisobutylketone, 4.0 g alumina powder, and 58.0 g silver flakes. The mixture was milled for over one day using 3-mm glass beads. After the milling, 13.7 g MEK was distilled out to obtain a thixotropic liquid. The liquid adhesive was deposited and cured according to the method described in Example 1. After curing, adhesive droplets with a height of over 1000 µm showed good adhesion and no cracks. The nominal silver content of the cured adhesive was 52 vol %. The remaining 48% binder consisted of 80 vol % sol-gel material and 20 vol % alumina The coefficient of thermal expansion, measured parallel to the substrate surface, was approximately 23 ppm/° C. in the range of 125 to 300° C.

EXAMPLE 4

A binder was prepared from TEOS, MTMS, and diphenylsilanediol. A mixture of 70.4 g ethanol, 4.8 g water, 0.02 g maleic acid, and 2.9 g TEOS was hydrolyzed for 10 minutes followed by the addition of 7.7 g MTMS. After a further 10 minutes of hydrolysis, 12.1 g diphenylsilanediol was dissolved in the mixture over a period of 15 minutes. As the diphenylsilanediol has a low reactivity under acidic conditions, the catalyst was changed to a base by adding 3.1 g ethanol containing 0.041 g KOH. The mixture was heated to boiling point and was kept hot for one hour. An oily phase appeared during this period. The mixture was allowed to cool overnight to form a two-phase system of a solid resin and alcohol. The resin was dissolved in toluene and washed with water to remove catalyst residues. After washing, the resin was dried. Experiments indicated that this resin was able to melt during curing similarly to the Silres 610. The solid resin was dissolved in MEK and it was stored as a solution for further use.

For the adhesive preparation, 13.3 g resin solution (containing 55.5% solids) was mixed with 6.1 g diisobutylketone, 21.3 g methylethylketone, and 59.3 g silver flakes. The mixture was milled for one day using 3-mm glass beads. After the milling, 26.6 g solvent was distilled out. The liquid adhesive was deposited on glass and cured at 415° C. for two hours. After curing, adhesive droplets with a height of over 1000 µm without cracks were formed. The nominal silver content of the cured adhesive was 52 vol %. Its coefficient of thermal expansion, measured parallel to the substrate surface, was approximately 51 ppm/° C. in the range of 125° C. to 300° C.

The invention claimed is:

1. An adhesive suitable for making a electrically conductive connection to a material or system which is operated at a temperature greater than 300° Celsius, wherein said adhesive comprises a sol-gel precursor and one or more metal particles and the sol-gel precursor comprises hybrid sol-gel materials consisting of methyltri(m)ethoxysilane, phenyitri(m)ethoxysilane, or diphenyldi(m)ethoxysiiane and wherein non-conductive particles with a size less than 1/10 of the size of the metal narticles are incorporated.

2. Adhesive according to claim 1, characterized in that the metal particles comprise silver particles or silver alloy particles.

3. Object provided with an adhesive according to claim 1, characterized in that the thickness of the adhesive is at least 100 µm.

4. An electrical domestic appliance comprising an adhesive according to claim 1, characterized in that the electrical domestic appliance comprises a (steam) iron, ironing device, hair dryer, hair styler, steamer or steam cleaner, garment cleaner, heated ironing board, facial steamer, kettle, pressurized boiler for system irons and cleaners, coffee maker, deep fat fryer, rice cooker, sterilizer, hot plate, hot-pot, grill, space heater, waffle iron, toaster, oven, or water flow heater.

5. An adhesive suitable for making a electrically conductive connection to a material or system which is operated at a temperature greater than 300° Celsius, wherein said adhesive comprises sol-gel precursor one or more metal particles and the sol-gel precursor comprises hybrid sol-gel materials consisting of methyltri(m)ethoxysilane, phenyltri(m)ethoxysilane, or diphenyldi(m)ethoxysilane and wherein non-conductive particles with a size less than 1/20 of the size of the metal particles are incorporated.

6. Adhesive according to claim 5, characterized in that the metal particles comprise silver particles or silver alloy particles.

7. Object provided with an adhesive according to claim 5, characterized in that the thickness of the adhesive is at least 100 µm.

8. An electrical domestic appliance comprising an adhesive according to claim 5 characterized in that the electrical domestic appliance comprises a (steam) iron, ironing device, hair dryer, hair styler, steamer or steam cleaner, garment cleaner, heated ironing board, facial steamer, kettle, pressurized boiler for system irons and cleaners, coffee maker, deep fat flyer, rice cooker, sterilizer, hot plate, hot-pot, grill, space heater, waffle iron, toaster, oven or water flow heater.

* * * * *